(12) United States Patent
Siu et al.

(10) Patent No.: US 7,464,103 B2
(45) Date of Patent: Dec. 9, 2008

(54) MULTI-LEVEL NESTED OPEN HASHED DATA STORES

(75) Inventors: Michael Yiu-Kwan Siu, Bellevue, WA (US); Clifford Paul Strom, Sammamish, WA (US); Brian Patrick Evans, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 10/976,463

(22) Filed: Oct. 29, 2004

(65) Prior Publication Data

US 2006/0095458 A1    May 4, 2006

(51) Int. Cl.
*G06F 17/30*    (2006.01)

(52) U.S. Cl. .................. 707/102; 707/2; 707/101

(58) Field of Classification Search .......... 707/2, 707/101, 102
See application file for complete search history.

(56) References Cited

U.S. PATENT DOCUMENTS

| | | | | |
|---|---|---|---|---|
| 5,893,086 | A * | 4/1999 | Schmuck et al. | 707/1 |
| 6,393,427 | B1 * | 5/2002 | Vu et al. | 707/101 |
| 6,781,956 | B1 * | 8/2004 | Cheung | 370/235.1 |
| 7,089,594 | B2 * | 8/2006 | Lal et al. | 726/31 |
| 2002/0073068 | A1 * | 6/2002 | Guha | 707/1 |

* cited by examiner

*Primary Examiner*—Shahid A Alam
*Assistant Examiner*—Phong Nguyen

(57) ABSTRACT

A method for storing data. A method for storing data comprising arranging a plurality of data buckets in a logical inverted tree structure having a plurality of levels; and performing nested hashing at each level of the plurality of levels.

10 Claims, 9 Drawing Sheets

700

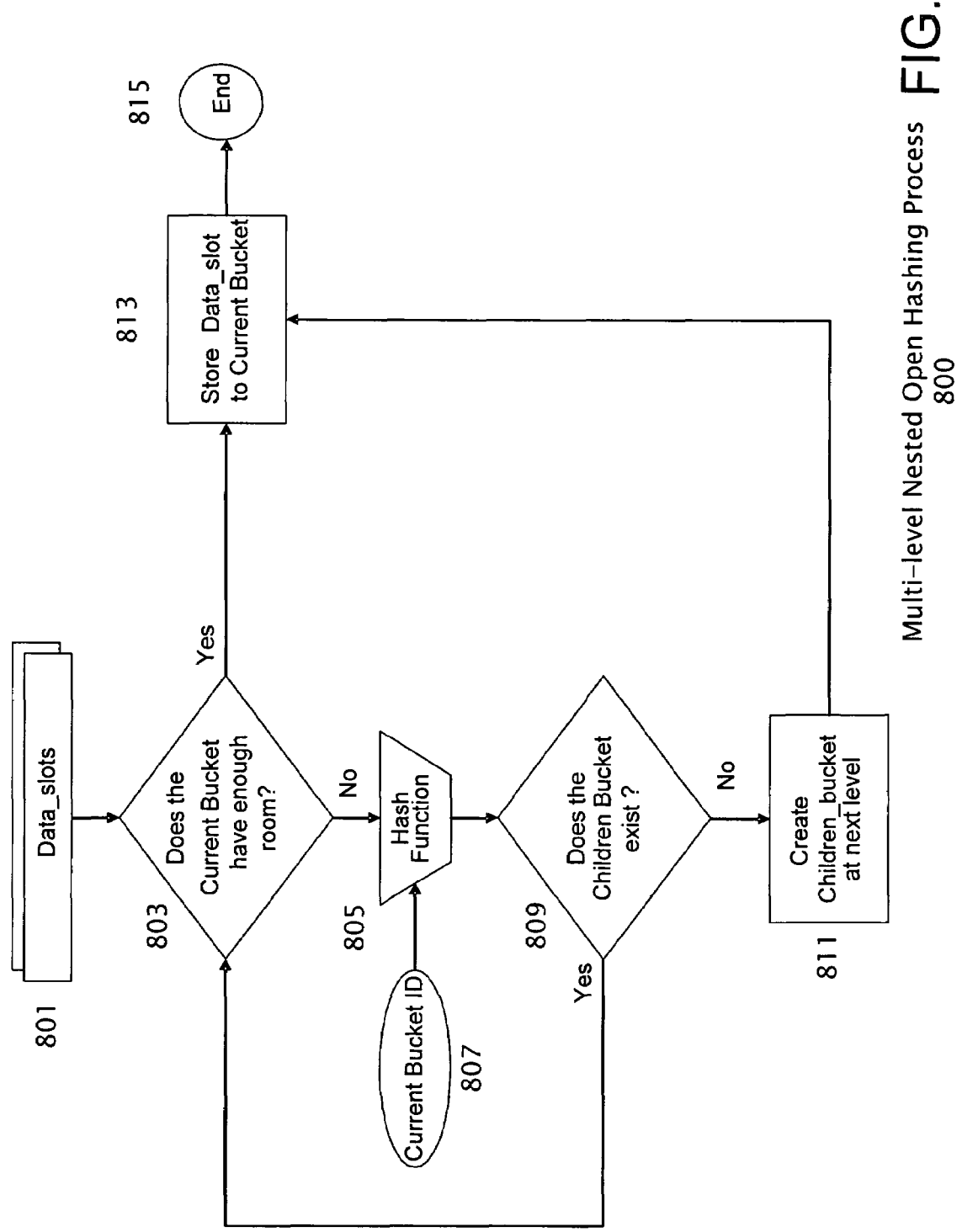

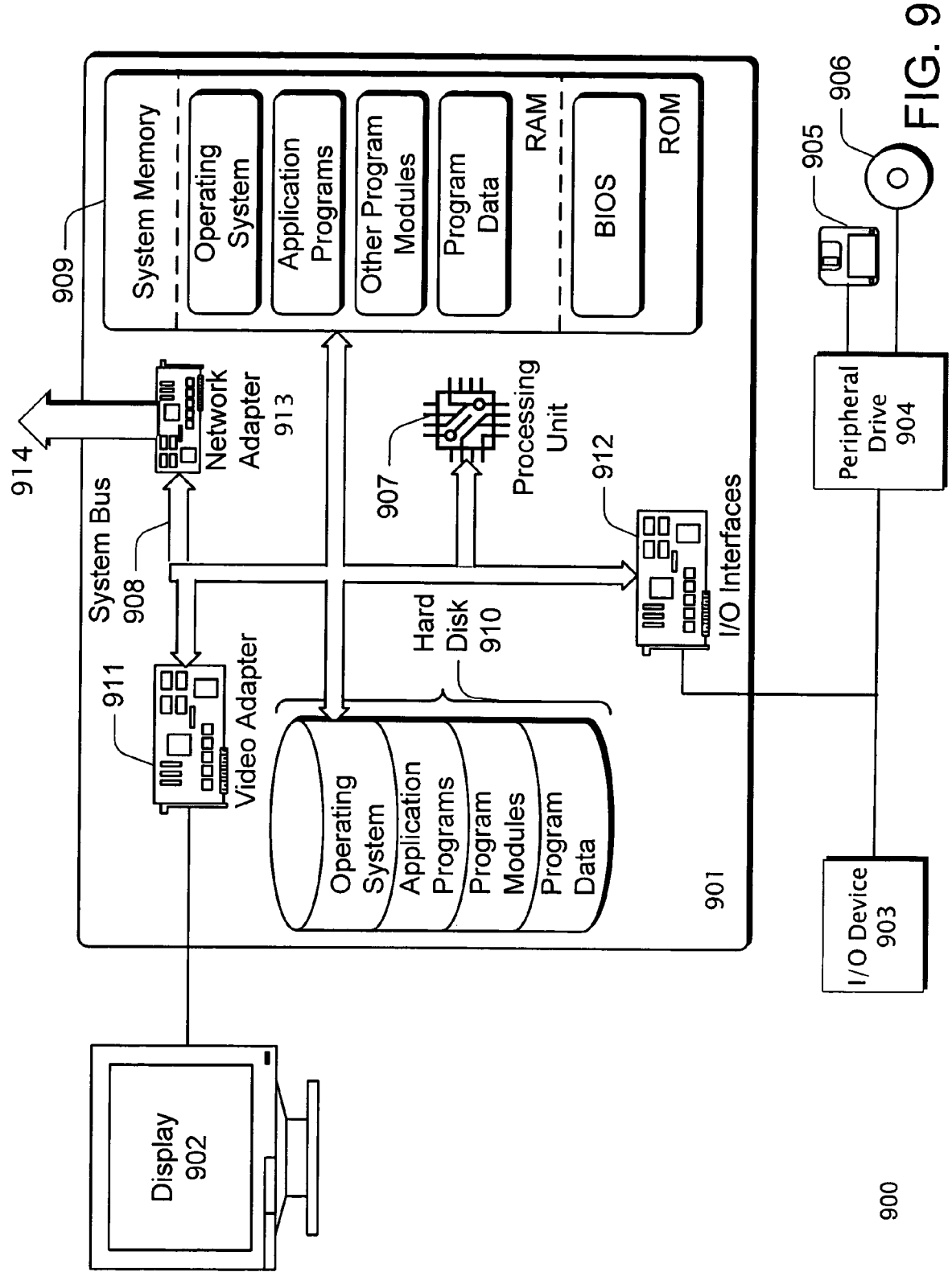

MULTI-LEVEL NESTED OPEN HASHED DATA STORES

BACKGROUND

This application relates generally to consumer electronic devices and more specifically to the management of keyed data records that relate media playback on consumer electronic devices.

Electronics may be designed to play or process content that is regulated. Such content may be controlled or owned by a third party that allows access to the content on a limited basis. Examples are allowing information to be accessed a predetermined number of times, or for a given time period. A common way of controlling access is through licensing or metering. Control of access is typically provided with security features to prevent unauthorized access at the time the electronics are manufactured.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides a method of storing generic keyed data records on disk-like storage that tends to speed up the access time of data on storage. The locations for storing data records on storage may be determined by building a logical tree of fixed size buckets in a way that tends to be balanced. The tree of buckets may be traversed, built and filled out by applying a hash function to the data records at each level of the tree along the way.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein:

FIG. 8 is a block diagram of the details of data slot allocation using the multi-level nested open hashing algorithm.

FIG. 9 illustrates an exemplary computing environment 800 in which the systems and methods described in this application, may be implemented.

Like reference numerals are used to designate like parts in the accompanying drawings.

DETAILED DESCRIPTION

Figure 1:
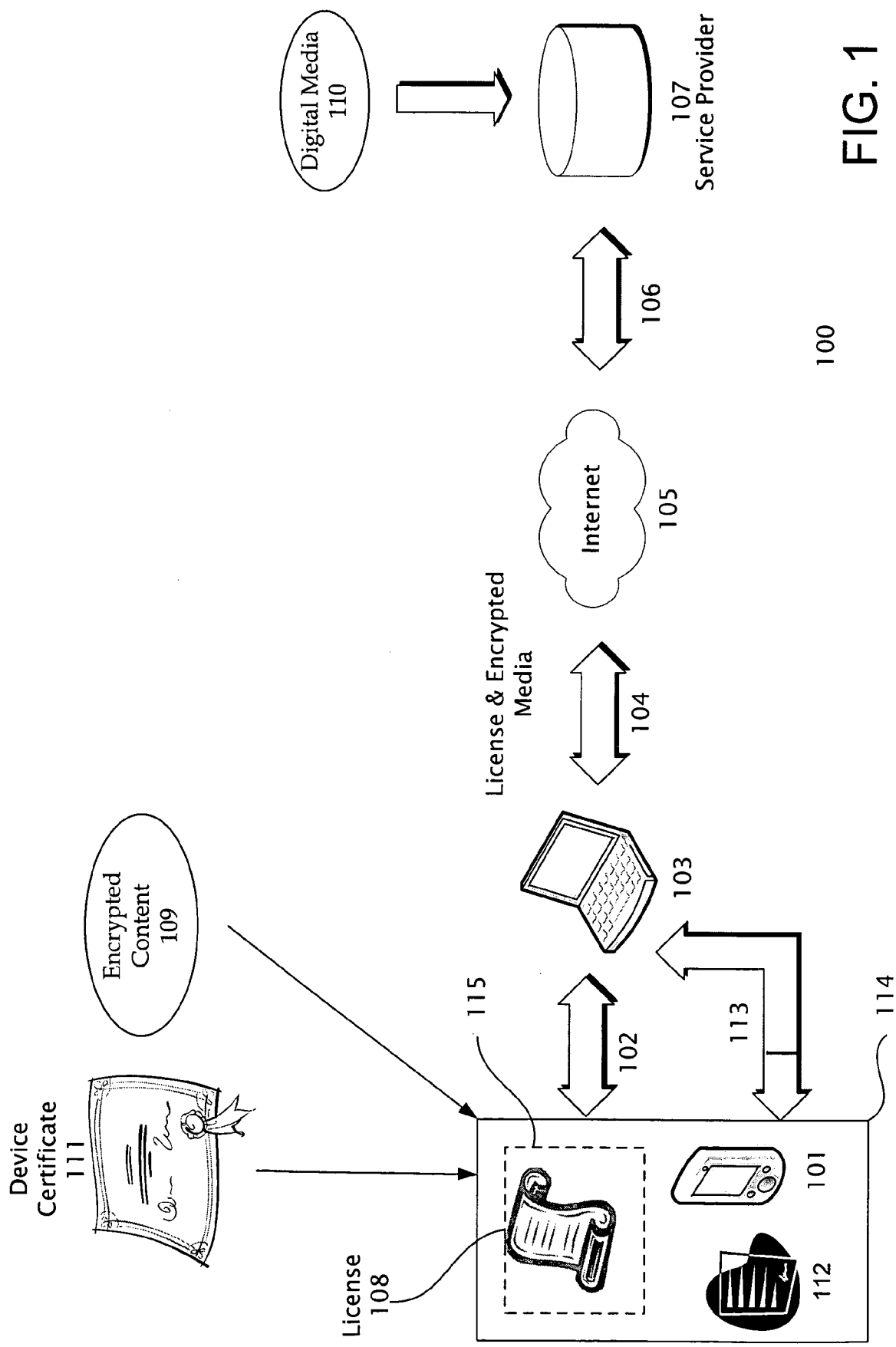
FIG. 1 is a diagram of a digital rights management system.

For desktop computers, music jukeboxes, consumer electronics ("CE") devices and the like, high performance license and general data storage tends to aid in maintaining large numbers of licenses and associated files which are often stored on these devices in a data store, or the like. For example in portable handheld CE devices, high performance and small code tend to be help performance due to the typically limited processing speed and power of CE device CPUs. In general the techniques described may be applied to any type of memory system where speed of access to data may be important.

A traditional way of obtaining fast data access to data in a data store (either in memory or on disk) is open hashing, a method that tends to be prone to data overflow and collisions. This invention enhances the open hashing algorithm by arranging data buckets in a logical inverted tree structure. By nesting hashing at each level of buckets, a bucket tree is constructed automatically. Data records can be stored in fixed size buckets without limits except for disk space.

The detailed description provided below in connection with the appended drawings is intended as a description of the present examples of the invention and is not intended to represent the only forms in which the present invention may be constructed or utilized. The description sets forth the functions of the invention and the sequence of steps for constructing and operating the invention in connection with the examples illustrated. However, the same or equivalent functions and sequences may be accomplished by different examples of the invention.

Although the multi-level nested open hashed data store is described and illustrated herein as being implemented in a consumer electronics ("CE") device system, the system described is provided as an example and not a limitation. CE devices may include pocket PCs, set top boxes, portable media centers, cell phones, music players, PCs, software constructed media players, and the like. These devices are typically configured to operate in a system that includes the internet, PCs and the like to work in conjunction with the CE device to facilitate license and content transfer.

As those skilled in the art will appreciate, multi-level nested open hashed data stores are suitable for application in a variety of different types of systems that control licenses on CE devices. A typical licensing system is a digital rights management ("DRM") system. The use of license synchronization ("license sync") may be useful in the license management and renewal processes for these types of systems.

Most current DRM solutions rely on unique identification of user devices, such as CE devices. Each license is typically bound to a unique consumer electronics device (or playback device), so the license stored in one CE device typically can not be transferred or used by another device. The licenses are typically stored separately from the content, typically in a log. In a DRM System the content, or files that are desired to be played, can be freely transferred. Transfer is typically over unsecured channels such as the internet. In a DRM system the playback of the content is controlled by a license that may be typically played on a specific CE device.

FIG. 1 is a diagram of a digital rights management system 100. Digital rights management (DRM) provides a system for defining, incorporating, and enforcing rights to digital media 110. In this type of system a multi-level nested open hashed data store 115 may be used to efficiently access licenses 108 that allow access to media files 109

A DRM system 100 provides secure distribution of multimedia content 110 from a service provider 107 over insecure channels 106 such as the Internet 105. The system 100 can enforce usage rules and protect the multimedia content 110 from being used illegally. Usage rules can include expiration dates, the number of times a user can play an audio or video file, and the number of times a user can copy an audio or video file and the like. An example of a Digital Rights Management system is provided in U.S. patent application Ser. No. 09/290, 363, filed Apr. 12, 1999, U.S. patent application Ser. Nos. 10/185,527, 10/185,278, and 10/185,511, each filed on Jun. 28, 2002 which are hereby incorporated by reference in its entirety.

A personal computer 103 may be used to connect to the internet 105 and transfer content from the service provider 107 to a consumer electronics device 101. The PC may have a large number of licenses stored on it. The licenses can have unlimited rights, rights to play the file a certain number of times, rights to play the file until a certain date, and the like. Management of the expiring licenses in a way that tends not to interfere with the use of the CE device tends to be provided by the embodiments of the invention.

Protocols for transferring information to the PC 103, and to the CE device 101 over paths 102 and 104 may be achieved by conventional connections such as USB, infrared, Blue Tooth, MTP and the like. These pathways may be useful for transmitting licenses and content, including renewing licenses that have expired or are due to expire.

In alternative embodiments a consumer electronics device may be coupled to a service provider without using the personal computer 103. The personal computer and the CE devices may operate utilizing any number of suitable operating systems known to those skilled in the art. The instructions for implementing the functions described in this application may exist as software, hardware (for example instructions burned into an ASIC), or a combination of both.

In typical use, DRM 100 protects contents 110 by providing encrypted data files 109. Since files 109 are encrypted, the data itself is protected. Thus, the files 109 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain a license 108. This license 108 is a way of exercising control over the encrypted file 110. A license 108 is typically granted to a single machine 101, and even if copied, it will not tend to function on other machines.

In this example of the application of a multi-level nested open hashed data store, each license 108 may be stored in a multi-level nested open hashed data store 115 that contains a plurality of licenses arranged for speedy retrieval. Multi-level nested open hashed data stores may be employed to store a variety of information, including device certificate 111, content 109, and the like. Multi-level nested open hashed data stores may be used in a variety of applications not limited to CE devices, PCs and the like. The description of multi-level nested open hashed data stores in association with the storage of licenses is an example, not meant to limit them to that particular application.

Data stores for licenses are storage systems that allow a large number of licenses to be stored, so that they may be accessed quickly. For example when a user of a CE device wishes to play a media file, the user typically does not want to experience a delay until the CE device finds the license and verifies it before playing the media file. CE devices typically do not have high performance memories or processors that allow for speedy access of files by conventional methods. A multi-level nested open hashed data store 115 typically allows efficient and speedy access to licenses stored on CE devices.

Each license 108 contains rights and restrictions, defining how the data in a file may be used, and under what conditions. For example, a music file license may contain a "right to play" but not a "right to burn to CD", and it might enable these rights for the period between Oct. 1, 2005 and Nov. 1, 2005. It is also possible that there will be multiple licenses for a file. Keeping track of these licenses, quickly checking them, and updating them as needed without creating undue burdens on the user may be a challenge in consumer acceptance of DRM systems. As long as one of those licenses grants the needed right, the user will be able to access and use their data. Access may refer to cryptographically decoding a file, gaining access to a file by password, and the like so that the consumer electronics device can use, view, play and otherwise use the content of the file.

In the embodiments of the invention described the license 108 works in conjunction with a device certificate 111 that allows the encrypted content 109 to be played on a consumer electronics device 101. The device certificate may be generated by a device certificate template 112. The file 109 can also be viewed if the CE device provides video, or picture capabilities. Files for viewing or playback would typically include music files, picture files, video files, documents, and the like. In short anything that a service provider wishes to transmit securely over an unsecured channel.

The system may provide license synchronization, which is a process of enumerating a store of license entries, and collecting lists of those which are expired or which are approaching expiration. License synchronization tends to allow license expiration to be anticipated and handled in a manner which does not degrade the user experience with interruptions in service.

Upon acquisition of a new license a license synchronization store may be created. This can be a hashed data store with slots identified by a single key, under which is inserted the data describing a license's expiration criteria. Synchronization-specific data from the license is typically not needed in the license synchronization store.

Synchronization may instead be based on the "license state" as described in the license's data structure. License expiration criteria may be defined by several possible values (e.g. license expiration based on count, date, play count, etc.). Applications may generate a challenge to refresh licenses prior to expiration.

Consumer electronic devices 101 that regulate playback may be referred to as digital rights management ("DRM") devices. Such devices may be part of a DRM system 100 that controls the distribution of protected content 109 and access to that content 110.

Figure 2:
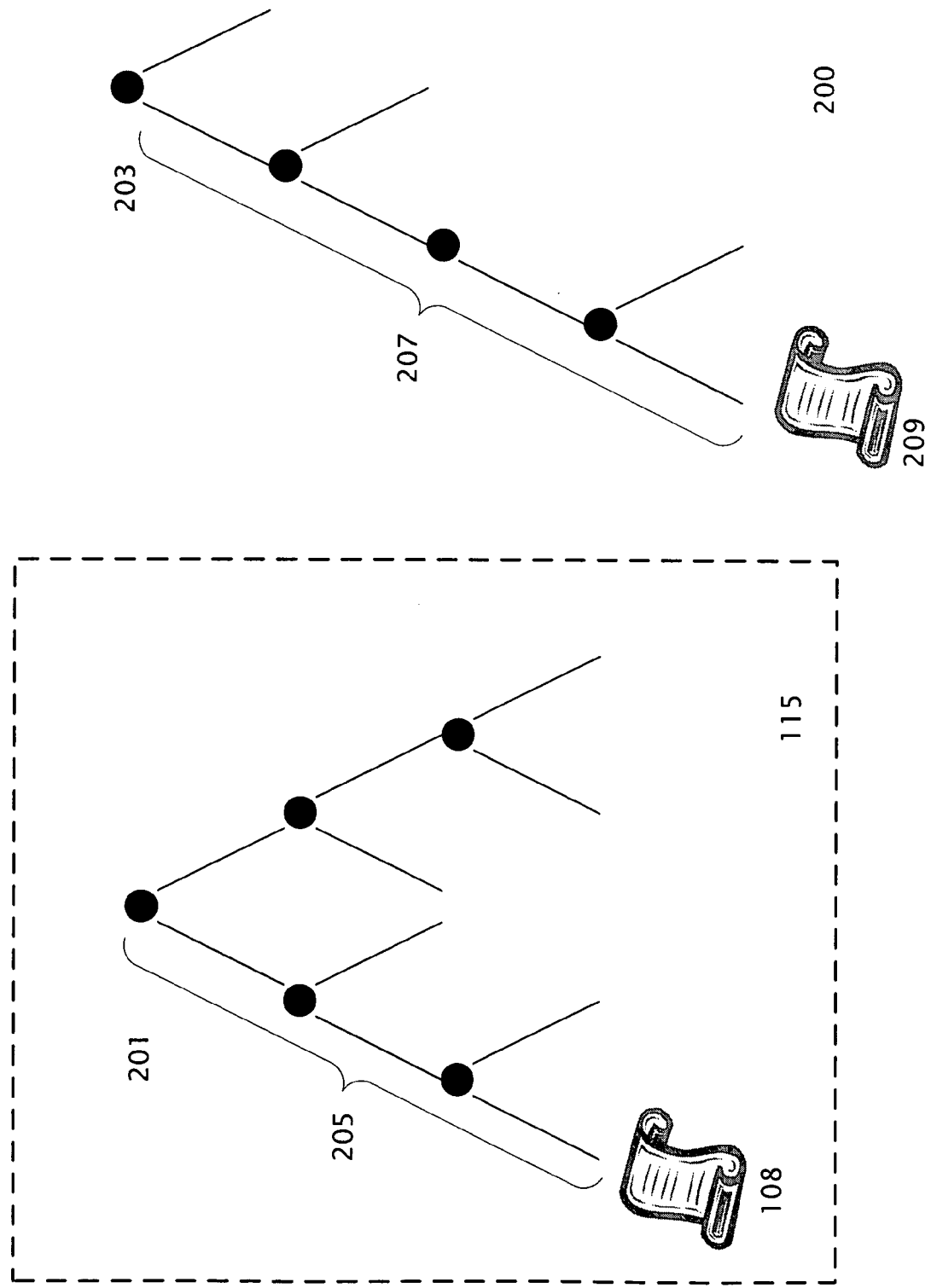
FIG. 2 illustrates decreased information access time associated with a uniform tree structure as compared to a non uniform tree data structure.

FIG. 2 illustrates decreased information access time associated with a balanced tree structure as compared to a non balanced tree data structure. Tree structure 15 may be termed as evenly distributed, balanced, uniform, or the like. It is structured, so that on average a piece of information 108 stored in this type of tree structure can be accessed quickly. A tree structure such as this can be used to store related data, such as in a data store. As can be seen the structure tends to have pathways 205, made up of branches and nodes that tend to have on average a shorter distance to the origin or root node 201 than a corresponding unbalanced, (or equivalently non uniform, asymmetric, or the like) tree structure in an alternate data store 200. In a non uniform tree structure average access time tends to be longer in the legs of the tree having a longer path 207.

In the example shown accessing the document 108 in the balanced tree structure 201 tends to be shorter than accessing the document 209 in the unbalanced tree structure 203, since the path is longer and more nodes are typically traversed. The embodiments of the invention tend to utilize a balanced tree structure formed by a multi-level nested open hashed data store to lessen access time to a piece of information stored in a memory block in the tree structure.

Figure 3:
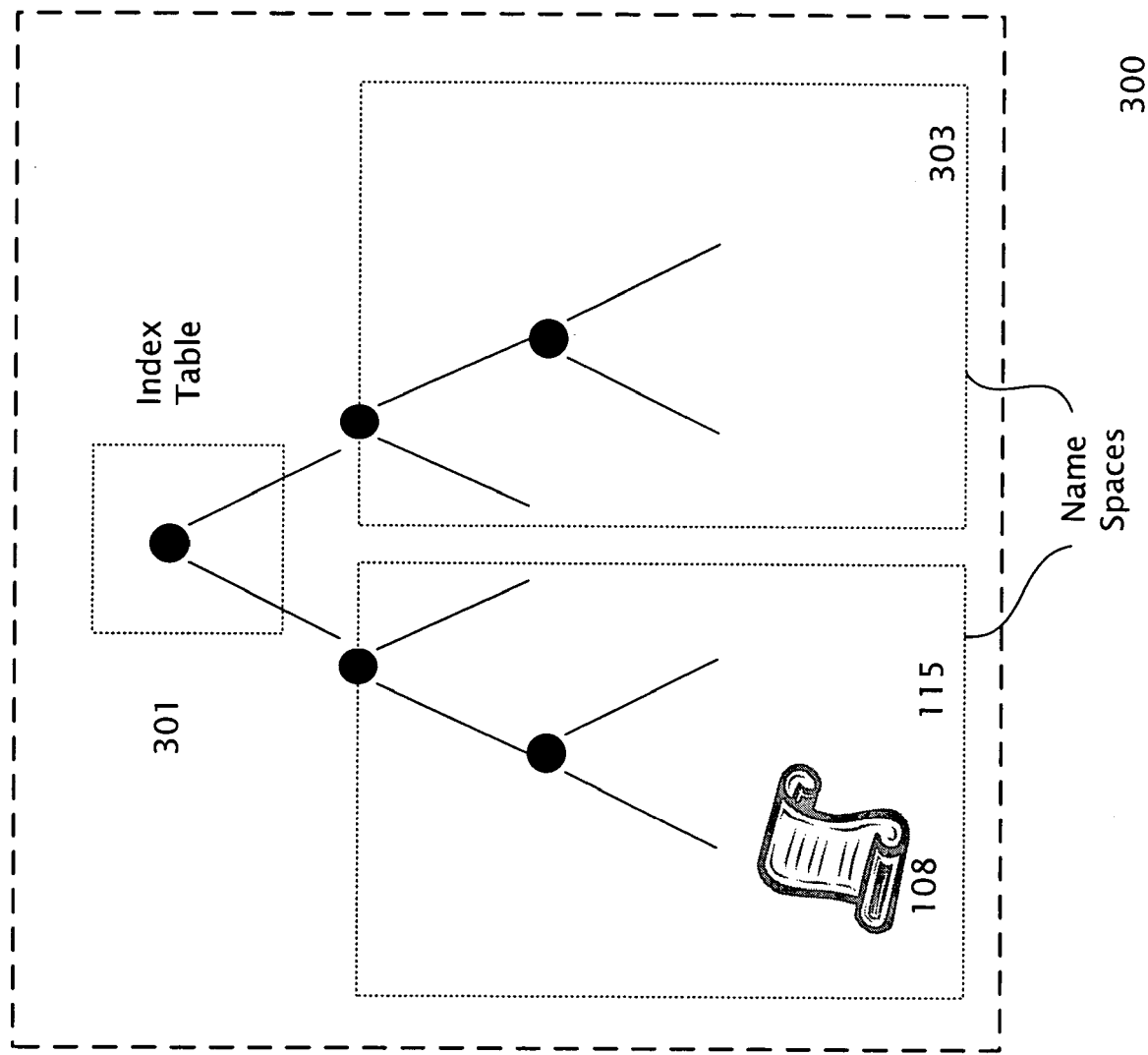
FIG. 3 illustrates multi-level nested open hashed data stores coupled together with an index table to form a forest of name spaces suitable for accessing different data stores.

FIG. 3 illustrates multi-level nested open hashed data stores coupled together with directory (or index table) to form a forest of name spaces suitable for accessing different data stores 300. A name space may be defined as a logical tree in a data store. A plurality of name spaces including name spaces 115 and 303 provide data storage. Name space 115 may store license information, while name space 303 may store other information, such as media content. The use of multi-level nested open hashed data stores in name spaces 115 and 303 allow balanced tree structures to be constructed tending to allow quick access to information stored there, such as license 108. In the memory structure shown 115, 303 an additional tree 301 is constructed to act as an index table to the individual name spaces 115, 303. The added tree 301 allows multiple types of information stored on a memory structure to be accessed through the index table.

Figure 4:
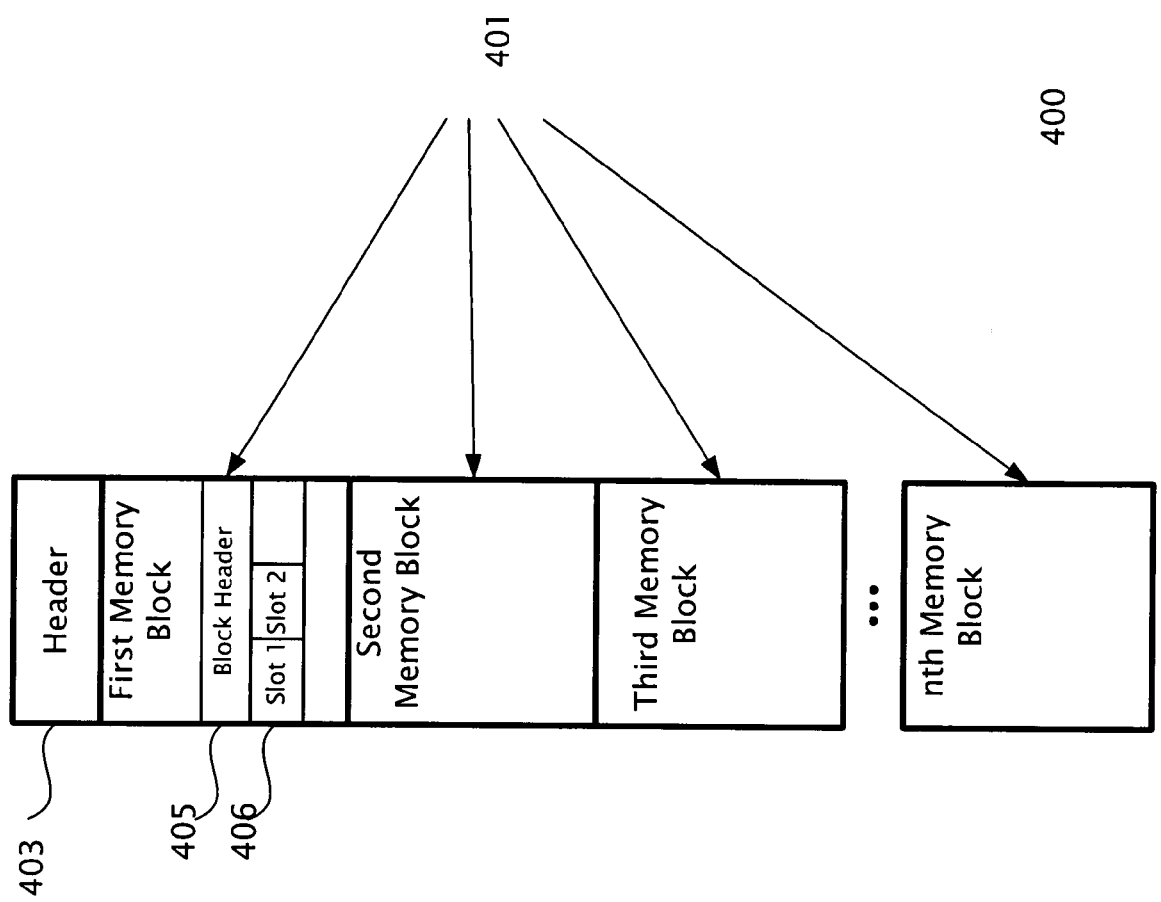
FIG. 4 is a block diagram of a memory structure that may use multi-level nested open hashed data stores to organize data stored in the memory.

FIG. 4 is a block diagram of a memory structure 400 that may use multi-level nested open hashed data stores to organize data stored in the memory. Memory structure 400 includes a header 403 followed by a plurality of memory blocks 401. A block is typically a sector where files will be stored. Each block contains a block header 405 and a plurality of data storage slots 406. A block header may contain information such as key information, an allocation table, available memory information and the like. Each memory block includes an address in its header that helps identify the memory block. The blocks 401 are of identical size so that information may be written or read by calculating offsets based on the file size and reading or writing to or from that location. In this type of system memory a multi-level nested open hashed data store may be applied.

Figure 5:
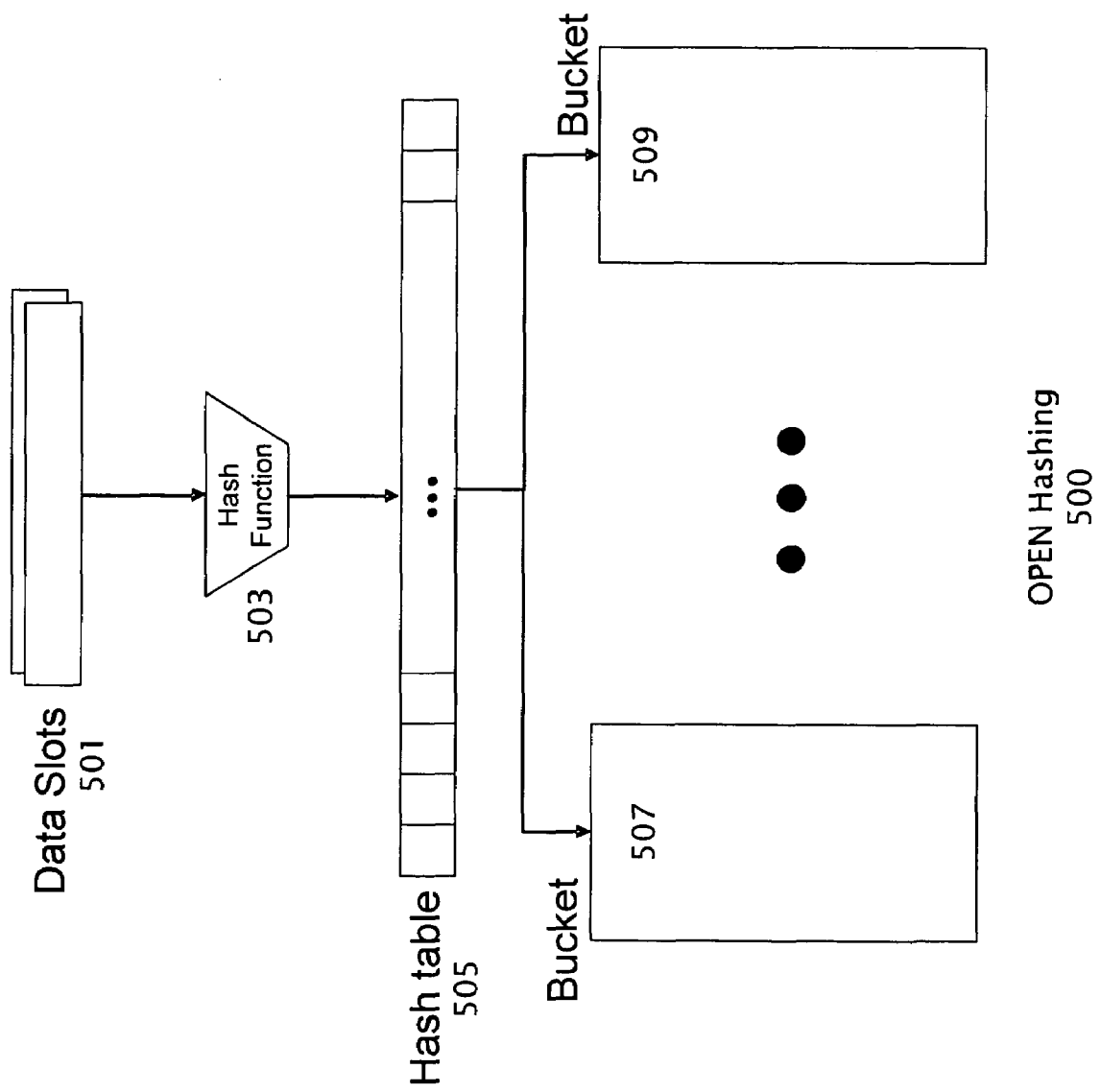
FIG. 5 illustrates conventional open hashing.

FIG. 5 illustrates conventional open hashing 500. A conventional way of obtaining fast data access (either in memory or on disk) is open hashing. With open hashing, the data access rate is approximately of order N/M, where N is the number of data records, and M is the number of hash buckets. However, a disadvantage of open hashing is data overflow and collisions. In open hashing a key of the data record 501 is hashed using 503 to yield a hash table 505 of fixed length which is used as a bucket identifier.

Open hashing may be susceptible to data overflow. When a bucket 507 is getting full, overflowed data records are either stored in adjacent buckets 509 or to an expanded bucket. A bucket is typically an allocation of storage, such as a file block. Since in open hashing the data records contained inside a bucket are not in any special order, data records within a bucket may be located via sequential search. Thus data access performance tends to get worse when the number of data records increases.

Frequent inability to play licensed content immediately on demand due to delays in accessing the license tends to interfere with the desired use of media players, and could hinder acceptance of DRM. A multi-level nested open hashed data store aids in creating a DRM that is beneath user notice.

Figure 6:
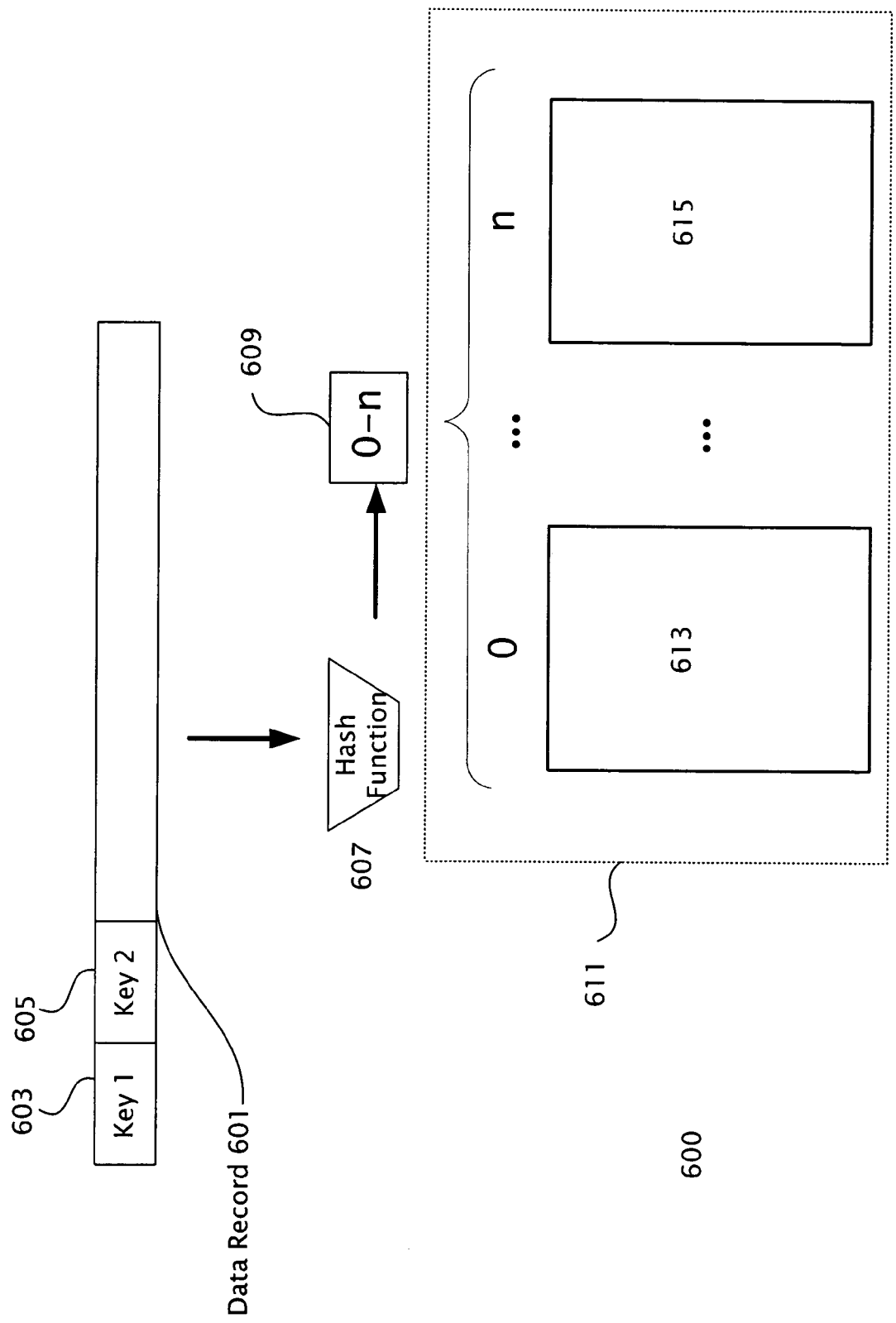
FIG. 6 is a block diagram showing how a hash function is used to generate bucket indexes used in a multi-level nested open hashed data store.

FIG. 6 is a block diagram showing how a hash function is used to generate bucket indexes used in a multi-level nested open hashed data store 600. Key 1 (603) is called the hashkey and Key 2(605) is called the uniquekey. Typically only Key 1 603 and the bucket ID of the parent bucket are used in hash function 607 to produce a number having n different states 609. Key 2, 605 is typically only used to identify the data record in a bucket, because 603 is not unique and many data records can have the same hashkey 603. That is how more than one license can be associated to a media content. In the example shown the MD5 hash function, or its equivalent, that typically produces an evenly distributed number may be used. An evenly distributed number helps to distribute the data records evenly across a balanced tree structure formed by the buckets. The n state number is used as an index to point to which of the 0 to n buckets 611 the data record 601 is stored. In storing data records with this method data records 601 that exceed the size allocated to the bucket can cause overflow problems. A multi-level nested open hashed data stores formation process tends to create new buckets when the data record 601 is too large to fit in the current bucket. In a conventional open hashed process overflows would be placed in buckets that are not balanced across a tree structure tending to degrade access time. In a conventional closed hash process data is lost if the data record exceeds the fixed bucket size.

In multi level nested open hashing the next level of buckets to handle the overflow contributes to the formation of a tree structure, with the first level referred to as the root.

Figure 7:
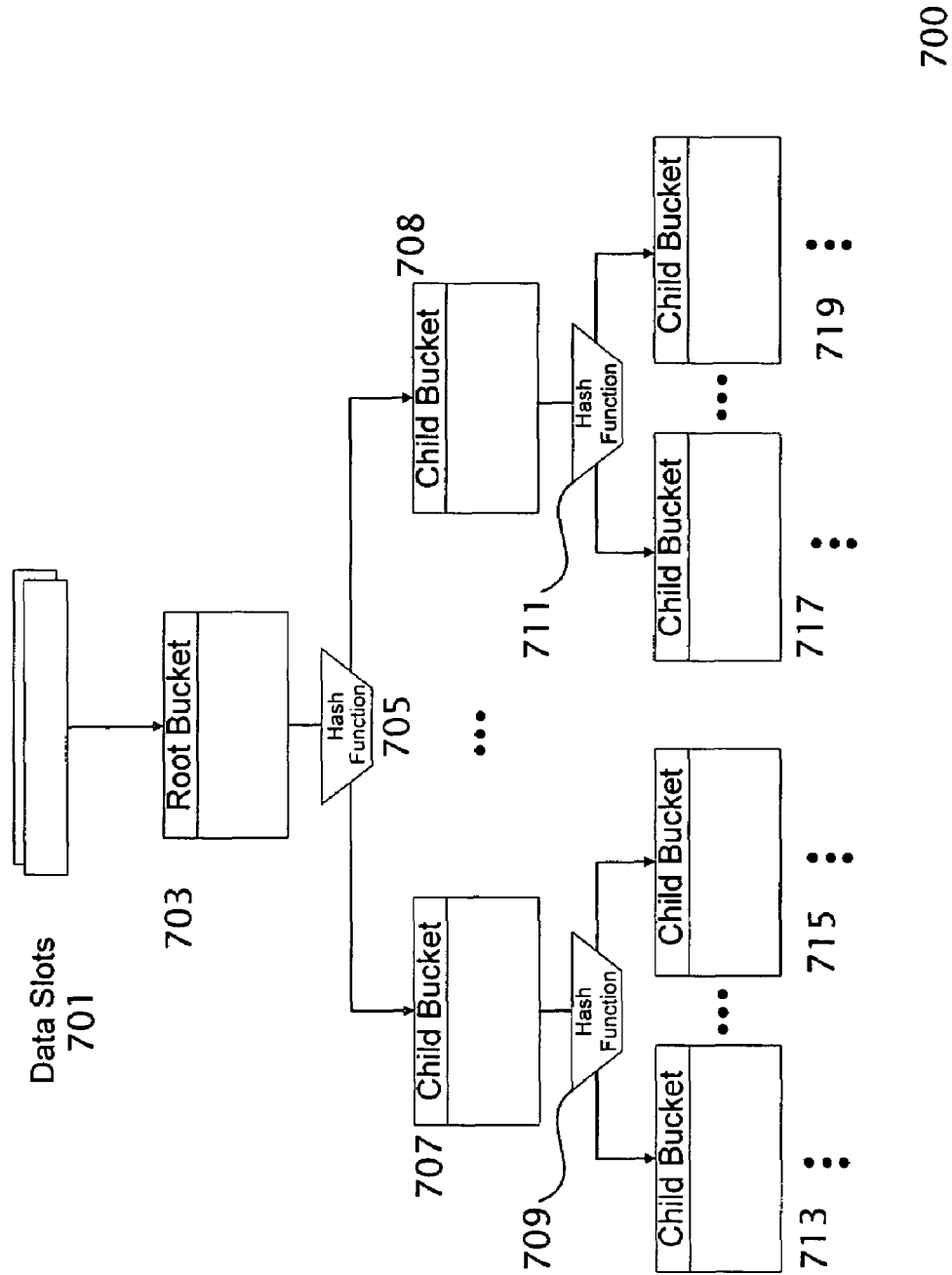
FIG. 7 is a block diagram showing the formation of a multi-level nested open hashed data store.

FIG. 7 is a block diagram showing the formation of a multi-level nested open hashed data store 700. Multi-level nested open hashed data stores tends to enhance open hashing by arranging data buckets in a logical inverted tree structure. Hashing is performed 705 on the identifier of the root bucket 703. When a bucket 707 is full, the hash function is applied again 709 at the current bucket 707 with the current data record 701 that is causing the overflow. This subsequent application of the hash function 709 starts a nested level of children buckets 713, 715 rooted to the current bucket 703. Any number of child buckets may be created. As FIG. 7 also illustrates, hashing may be performed 705 on the identifier of the root bucket 703 to form child bucket 708. When child bucket 708 is full, the hash function may be applied 711 to child bucket 708 with the current data record 701 causing the overflow. This subsequent application of the hash function 711 may start a nested level of child buckets 717, 719 rooted to the current bucket 703.

The root bucket 703 is the first bucket in the tree, and no hashing has been performed on the root bucket 703. The root bucket is a memory block that is simply filled with information until it has reached capacity. At the end of the block is an allocation table that points to related blocks. The allocation table may be a number from 0 to n that has been found by applying the hash function 705. Applying the hash function results in assigning an address location, where the data overrunning the data block of the root bucket 703 may continue to be written 707. The physical location of the block could be located at various places in the memory. In the example provided the blocks are 32 KB in size.

By performing nested hashing at each level of buckets, a bucket tree 700 can be constructed automatically. Data records 301 can be stored in fixed size buckets, typically without limitations except for disk space. The average performance may be characterized as an order of $(\log_M N)$, where the base of the log function, M is the number of children buckets per parent, and N is the total number of buckets in the tree.

The multi-level nested open hashed data store may be described as a raw data format file storage mechanism. Storing, updating, searching and removing of small pieces of information are necessary in almost every application running on computers, from desktop computers to small handheld devices. Typical methods range from maintaining simple flat files to utilizing complex relational databases. In CE devices having limited processor and memory capabilities code size, data file size, and performance are factors that merit attention.

The multi-level nested open hashed data store typically provides general purpose data storage fast data access rate (to the order of log N, where N proportions to file size) for inserting, updating, lookup and removal of a number of arbitrary sized data records. Multiple nested and isolated logical storages can co-exist in the same physical file. The multi-level nested open hashed data store may be configured to fit different uses in different environment on a variety of platforms, including CE devices.

The multi-level nested open hashed data store may be useful when applied to Digital Rights Management ("DRM") being run on machines from desktop computers, jukeboxes to portable handheld devices (or CE devices). For desktop computers and music jukeboxes, high performance license storage is typically used to maintain large number (typically greater than 200,000 licenses) of licenses. For portable handheld CE devices, high performance and small code size can be helpful due to the typically limited CPU power of CE devices.

FIG. 8 is a block diagram of the details of data slot allocation in the multi-level nested open hashing process. To look up a specific data record in the bucket tree, a similar procedure as above is applied: when navigating a bucket, instead of storing, search the bucket for the target data record using the Unique_key, which is key2.

At block 803 a determination is made to determine if the current bucket has room. If the current bucket has room the process proceeds to block 813 where the data slot is stored in the current bucket. If the current bucket does not have room a hash operation is performed at block 805. The hashing operation may be expressed as: Hash(Data hashkey, Current bucket ID). Where Data hashkey represents Key1, or its equivalent. Current bucket ID 807 represents an identifier which typically uniquely identifies the bucket. In the current implementation, the bucket ID of a bucket may be its physical offset from beginning of file. Bucket ID is typically implementation dependent. At block 809 it is determined if the current bucket exists. If the current bucket exists the process returns to block 803. At block 811 a child bucket is created. Next data is stored in the current bucket at block 813. At block 815 the process ends.

In performing the process described above each data record 801 should be identifiable by a uniquekey (an integer or a string which is equivalent to Key2 of FIG. 6), and should provide a hashkey (which is equivalent to Key1 of FIG. 6) to be hashed upon. Each bucket of the tree is typically uniquely identified by the Bucket ID. The maximum number of children buckets per parent should remain constant after tree creation. The bucket size should remain constant after file creation. To store data records of arbitrary size, a linked list of "special" buckets may be created to store data records when the size needed is bigger than a bucket.

By applying the multi-level nested open hashing process described above, a logical store represented by the bucket tree is formed. When applying the process repeatedly, multiple independent logical stores can be created and nested within one another to form a hierarchy having a simple file system.

FIG. 9 illustrates an exemplary computing environment 900 in which the systems and methods described for multi-level nested open hashing, may be implemented. Exemplary computing environment 900 is only one example of a computing system and is not intended to limit the examples described in this application to this particular computing environment.

The computing environment 900 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 900 includes a general-purpose computing system in the form of a computing device 901. The components of computing device 901 can include one or more processors (including CPUs, GPUs, microprocessors and the like) 907, a system memory 909, and a system bus 908 that couples the various system components. Processor 907 processes various computer executable instructions to control the operation of computing device 901 and to communicate with other electronic and computing devices (not shown). The system bus 908 represents any number of several types of bus structures, including a memory bus or memory controller, a peripheral bus, an accelerated graphics port, and a processor or local bus using any of a variety of bus architectures.

The system memory 909 includes computer-readable media in the form of volatile memory, such as random access memory (RAM), and/or non-volatile memory, such as read only memory (ROM). The multi-level nested open hashing scheme for data stores can be applied to the system memory 909. A basic input/output system (BIOS) is stored in ROM. RAM typically contains data and/or program modules that are immediately accessible to and/or presently operated on by one or more of the processors 907.

Mass storage devices 904 may be coupled to the computing device 901 or incorporated into the computing device by coupling to the buss. Such mass storage devices 904 may include a magnetic disk drive which reads from and writes to a removable, non volatile magnetic disk (e.g., a "floppy disk") 905, or an optical disk drive that reads from and/or writes to a removable, non-volatile optical disk such as a CD ROM or the like 906. Computer readable media 905, 906 typically embody computer readable instructions, data structures, program modules and the like supplied on floppy disks, CDs, portable memory sticks and the like.

Any number of program modules can be stored on the hard disk 910, Mass storage device 904, ROM and/or RAM 909, including by way of example, an operating system, one or more application programs, other program modules, and program data. Each of such operating system, application programs, other program modules and program data (or some combination thereof) may include an embodiment of the systems and methods described herein.

A display device 902 can be connected to the system bus 908 via an interface, such as a video adapter 911. A user can interface with computing device 901 via any number of different input devices 903 such as a keyboard, pointing device, joystick, game pad, serial port, and/or the like. These and other input devices are connected to the processors 907 via input/output interfaces 912 that are coupled to the system bus 908, but may be connected by other interface and bus structures, such as a parallel port, game port, and/or a universal serial bus (USB).

Computing device 900 can operate in a networked environment using connections to one or more remote computers through one or more local area networks (LANs), wide area networks (WANs) and the like. The computing device 901 is connected to a network 914 via a network adapter 913 or alternatively by a modem, DSL, ISDN interface or the like.

Those skilled in the art will realize that storage devices utilized to store program instructions can be distributed across a network. For example a remote computer may store a tool such as the multi-level nested open hashing process software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for storing data records in a tree structure comprising a root bucket and a plurality of levels comprising buckets, the buckets comprising leaf and non-leaf buckets, each bucket having a unique bucket identifier, the buckets storing the data records, each data record having a corresponding key, the method comprising:

providing a hash function that maps different pairs of values to respective single hash values;

receiving a new key for a new data record to be stored in the tree structure;

responsive to determining that the root bucket does not have sufficient available space to store the new data record, using the hash function to map the identifier of the root bucket and the key of the new data record to a hash value, the hash value being computed as a function of the key combined with the identifier of the root bucket such that the key and the identifier of the root bucket are mapped to the hash value according to the hash function;

identifying an identifier of a child bucket of the root bucket in the tree structure, where the identifier of the child bucket is identified based on the hash table value;

responsive to determining that the child bucket does not have sufficient available space to store the new data record, hashing the identifier of the child bucket and the key of the new data record to compute a second hash value which is used to identify a child bucket at a third level in the tree structure; and responsive to determining that the child bucket does have sufficient available space to store the new data record, storing the new data record in the child bucket.

2. The method of storing data of claim 1, in which the root bucket and the child buckets are of a fixed size.

3. The method of storing data of claim 1, in which the root bucket and the child buckets are stored in the memory of a CE device.

4. The method of storing data of claim 3, in which the CE device operates in a DRM system.

5. The method of storing data of claim 3, in which the root bucket and the child buckets store a plurality of licenses.

6. A method of forming a memory tree comprising:

providing a hash function that maps different pairs of values to respective single hash values;

using the hash function to hash both a first key and a first bucket ID to produce, as a function of both the first key and the first bucket ID, a first n-state number, where the value of the n-state number depends on the values of both the first key and the first bucket ID, and obtaining a second bucket ID using the n-state number, the second bucket ID corresponding to a second memory bucket which is a child of the first memory bucket;

using the hash function to hash both a second key and the second bucket ID to produce, as a function of both the second key and second bucket ID, a second n-state number, the second key corresponding to a second data record and the second bucket ID identifying the second memory bucket, and using the second n-state number to identify an overflow storage bucket that is a child of the second memory bucket;

determining whether the first memory location is full; and if it is determined that the first memory bucket is full, storing at least a portion of the second data record in the overflow storage bucket.

7. The method of forming a balanced memory tree of claim 6, further comprising adding an un-hashed root bucket that is filled before the overflow storage bucket.

8. A method of populating a multilevel nested hash store comprising a tree of buckets and a hash function, each bucket having a unique bucket ID, the tree being formed by linking the buckets with bucket IDs, where the buckets are for storing data chunks, and the data chunks having respective keys, the method comprising:

providing a hash function that maps different pairs of values to respective single hash values;

receiving new keys of respective new data chunks to be stored in the hash store;

identifying target buckets for the new keys, and determining if the target buckets have sufficient space to store the new data chunks;

when a new key's target bucket is determined to have sufficient available space to store the new key's data chunk, storing the new key's data chunk in the new key's target bucket; and when a new key's target bucket is determined to not have sufficient available space to store the new key's data chunk:

using the hash function to compute a single first hash value of both the new key and the bucket ID of the new key's target bucket, the first hash value being computed as a function of both the new key and the bucket ID of the target bucket such that the value of new key and the value of the bucket ID map to the first hash value according to the hash function;

selecting a bucket ID of one of the target bucket's children buckets based on the first hash value;

storing the new key's data chunk in the bucket of the selected bucket ID if the bucket of the selected bucket ID has sufficient available space; and using the hash function to compute a single second hash value of the new key combined with the selected bucket ID, the second hash value being computed as a function of the new key combined with the bucket ID of the selected bucket such that the value of the new key and the value of the bucket ID of the selected bucket map to the second hash value according to the hash function, and using the second hash value to select a child bucket of the selected bucket as a bucket for storing the new data chunk.

9. A method according to claim 8, wherein the data chunks comprise digital media rights license data.

10. A method according to claim 8, further comprising forming a new child bucket when a selected bucket does not exist.

* * * * *

UNITED STATES PATENT AND TRADEMARK OFFICE
CERTIFICATE OF CORRECTION

| | | |
|---|---|---|
| PATENT NO. | : 7,464,103 B2 | Page 1 of 1 |
| APPLICATION NO. | : 10/976463 | |
| DATED | : December 9, 2008 | |
| INVENTOR(S) | : Michael Yiu-Kwan Siu et al. | |

It is certified that error appears in the above-identified patent and that said Letters Patent is hereby corrected as shown below:

In column 10, line 18, in Claim 8, delete "multilevel" and insert -- multi-level --, therefor.

Signed and Sealed this
Tenth Day of May, 2011

David J. Kappos
*Director of the United States Patent and Trademark Office*